United States Patent
Hermeling et al.

(10) Patent No.: US 11,770,004 B2
(45) Date of Patent: Sep. 26, 2023

(54) BATTERY INVERTER SYSTEM

(71) Applicant: SMA Solar Technology AG, Niestetal (DE)

(72) Inventors: Dirk Hermeling, Petershagen (DE); Tim Roesinger, Kassel (DE); Mohamed Mostafa, Paderborn (DE)

(73) Assignee: SMA Solar Technology AG, Niestetal (DE)

( * ) Notice: Subject to any disclaimer, the term of this patent is extended or adjusted under 35 U.S.C. 154(b) by 191 days.

(21) Appl. No.: 17/472,797

(22) Filed: Sep. 13, 2021

(65) Prior Publication Data

US 2021/0408796 A1 Dec. 30, 2021

Related U.S. Application Data

(63) Continuation of application No. PCT/EP2020/055491, filed on Mar. 3, 2020.

(30) Foreign Application Priority Data

Mar. 12, 2019 (DE) ...................... 10 2019 106 257.8

(51) Int. Cl.
*H02J 3/32* (2006.01)
*H02M 7/493* (2007.01)
(Continued)

(52) U.S. Cl.
CPC .............. *H02J 3/32* (2013.01); *H02M 7/493* (2013.01); *H02H 7/268* (2013.01); *H02M 1/32* (2013.01)

(58) Field of Classification Search
CPC ........... H02J 3/32–322; H02J 3/38–50; H02M 7/493; H02M 1/32; H02M 1/325; H02H 3/087; H02H 7/267–268; H02H 7/30
See application file for complete search history.

(56) References Cited

U.S. PATENT DOCUMENTS

2012/0119704 A1   5/2012  Beranger
2016/0226256 A1*  8/2016  Falk ..................... H02J 3/466
                          (Continued)

FOREIGN PATENT DOCUMENTS

CN    107425704 A   12/2017
EP    1537647 B1    6/2005
                    (Continued)

OTHER PUBLICATIONS

D. M. Bui, S.-L. Chen, C.-H. Wu, K.-Y. Lien, C.-H. Huang and K.-K. Jen, "Review on protection coordination strategies and development of an effective protection coordination system for DC microgrid," Dec. 7, 2014, 2014 IEEE PES APPEEC, pp. 1-10. (Year: 2014).*

(Continued)

*Primary Examiner* — Rexford N Barnie
*Assistant Examiner* — David A Shiao
(74) *Attorney, Agent, or Firm* — Eschweiler & Potashnik, LLC

(57) ABSTRACT

A battery inverter system includes a plurality of battery inverter units, wherein each of the battery inverter units includes a multiphase inverter and a battery unit connected to the inverter on the DC side. The battery unit includes a plurality of individual units connected in parallel to one another and protected against overcurrent by means of rack fuses, and the battery inverter units are connected in parallel on the AC side and are configured to operate with a common drive pulse pattern. The battery inverter units are interconnected on the DC side via compensation fuses, wherein the compensation fuses are provided such that in the event of a short circuit in one of the inverters, the compensation fuses are triggered faster than the rack fuses.

15 Claims, 3 Drawing Sheets

(51) Int. Cl.
 *H02M 1/32* (2007.01)
 *H02H 7/26* (2006.01)

(56) References Cited

U.S. PATENT DOCUMENTS

| | | |
|---|---|---|
| 2019/0214918 A1 | 7/2019 | Kawamura |
| 2019/0386482 A1* | 12/2019 | Mathurai ............ H02H 1/0007 |
| 2021/0075218 A1* | 3/2021 | Cao ........................ H02M 1/32 |
| 2023/0086269 A1* | 3/2023 | Chen ........................ H02H 7/20 |

FOREIGN PATENT DOCUMENTS

| | | |
|---|---|---|
| EP | 3073599 A1 | 9/2016 |
| WO | 2017090896 A1 | 6/2017 |

OTHER PUBLICATIONS

International Search Report dated Apr. 9, 2020 in connection with PCT/EP2020/055491.
Monica P. et al.; "Control strategies of parallel operated inverters in renewable energy application: A review"; Renewable and Sustainable Energy Reviews, Elseviers Science, New York, NY, US, vol. 65, Jul. 25, 2016 (Jul. 25, 2016).

\* cited by examiner

BATTERY INVERTER SYSTEM

CROSS REFERENCE TO RELATED APPLICATIONS

This application is a continuation of International Patent Application number PCT/EP2020/055491, filed on Mar. 3, 2020, which claims priority to German Patent Application number 10 2019 106 257.8, filed on Mar. 12, 2019, and is hereby incorporated by reference in its entirety.

FIELD

The disclosure relates to a battery inverter system with a plurality of battery inverter units connected in parallel.

BACKGROUND

Battery inverter systems are being increasingly used in order to temporarily store surplus energy from public energy supply grids and in order to provide grid supporting functions. For this purpose, correspondingly high storage capacities of the energy storage device, typically lithium-ion batteries, in the range of several megawatt hours, and also inverter powers in the megawatt range, are required. For applications of this type, a plurality of inverter bridges are usually connected in parallel on the AC side, in order to provide the required converter power. Connecting each of the inverter bridges to their own battery unit on the DC side and not coupling the battery units is known.

For a particularly efficient and cost-effective battery inverter system, it is desirable to be able to operate the inverter bridges with the same drive pulse pattern, i.e. with a common control. At the same time, a further cost reduction is created by using AC filter chokes, which can be produced in a particularly cost-effective manner due to the fact that they do not counteract circulating currents between the inverter bridges. By eliminating the need for providing a magnetic coupling between AC filter chokes of different inverter bridges, the design of the filter choke can be simplified in such a way that it enables an enormous cost reduction.

However, as a result of this simplification, it becomes necessary to connect the battery units in parallel, so that identical input voltages are applied to the DC inputs of the inverter bridges and it is ensured that all of the battery units always have the same state of charge. The disadvantage of this parallel connection of the battery units is the behavior in the event of a fault, for example, in the event of a short circuit in an inverter. In this case, short circuit currents arise on the DC side which are so high that it is not possible to protect the entire battery unit with a common fuse. In fact, it is necessary to divide the battery unit into lots of individual units, here referred to as battery racks in a simplified manner, and to protect them individually with rack fuses. The term rack fuse does not necessarily refer to the fuse of an individual unit built into a rack, but rather it refers to an individual unit, of which the operating current or short-circuit current is dimensioned in such a way that a sufficiently fast fuse is available at low cost. At present, this applies to fuses with a nominal value of up to 200 A.

Nevertheless, according to the prior art, with battery units connected in parallel, in the extreme cases of a short circuit of an inverter, the short circuit results in all rack fuses being triggered and having to be replaced.

SUMMARY

The present disclosure is directed to a battery inverter system with battery units connected in parallel on the DC side that can be protected such that only a fraction of the rack fuses has to be replaced in the event of a short circuit of an inverter.

According to the disclosure, a battery inverter system comprises a plurality of battery inverter units, wherein each of the battery inverter units comprises a multiphase, for example three-phase, inverter and a battery unit connected to the inverter on the DC side. The battery units each comprise a plurality of battery packs connected in parallel to one another and protected against overcurrent by means of rack fuses, and the battery inverter units are connected in parallel on the AC side and in each case are configured to operate with a common drive pulse pattern for operation. The battery inverter units are interconnected on the DC side via compensation fuses, and the compensation fuses are provided such that in the event of a short circuit in one of the inverters, the compensation fuses are triggered faster than the rack fuses. The connection of the battery inverter units via the compensation fuses can take place from any point of the electrical connection between the battery units and the inverters of the battery inverter units to be connected. In one embodiment, the connection is formed such that the DC-side input voltage of all inverters of the battery inverter system is the same in the case of intact compensation fuses.

This embodiment of the battery inverter system minimizes compensation currents between the battery inverter units during normal operation, without requiring complex filter arrangements on the AC side, wherein at the same time it is ensured that the battery units have the same state of charge, such that their capacity can be used in an optimal manner. Owing to the low compensation currents, fuses with a nominal value which corresponds to the nominal value of the rack fuses can therefore be used as compensation fuses. In one embodiment, there is not more than a factor of two between both nominal values, wherein the nominal value of the compensation fuse does not have to be higher than the nominal value of the rack fuse, but rather can be lower. Even in a case of a higher nominal value of the compensation fuse compared to the rack fuses, this ensures a faster triggering of the compensation fuse in the event of a short circuit, since in this case at least the total current of an entire battery unit with its plurality of individual units and thus a current that is much higher than the short circuit current of a battery pack flowing across one rack fuse flows across the compensation fuse and ensures an earlier triggering via an $I^2t$ trigger characteristic.

In this way, in an embodiment of a battery unit formed from five individual units connected in parallel, of which each individual unit provides a short circuit current of 250 A, the battery unit can supply a short circuit current of 1250 A. This short circuit current of a battery unit that is adjacent to a battery inverter unit causing a short circuit then flows across the compensation fuse, so that in the case of an expected $I^2t$ trigger characteristic, the compensation fuse is triggered within a trigger time that is shorter than a rack fuse of the battery unit by a factor of 25 (correspondingly ($1250$ $A/250$ $A)^2$), compared to a rack fuse of the same nominal value as the nominal value of the compensation fuse. This triggering behavior even ensures a faster triggering of a compensation fuse compared to a rack fuse if the nominal value of the comparison fuse is higher than the nominal value of the rack fuse by factor of 2. A higher number of rack fuses or individual units within a battery unit further supports this effect, since the short circuit current of the entire battery unit scales with the number of individual units compared to the short circuit current of an individual unit flowing across the rack fuse. For the same reason, a compensation fuse across which the short circuit current of a plurality of battery units flows is triggered reliably faster than a compensation fuse (of the same nominal value) across which the short circuit current of one single battery unit flows.

When using fuses with a nominal value between 100 A and 1000 A for the compensation fuses and the rack fuses, for example, a sufficiently fast triggering behavior can be ensured at fuse costs which are still low, in order to avoid damage to the battery units in the event of a short circuit. In one embodiment, fuses with a nominal value of 200 A are suitable.

In one embodiment of the disclosure, adjacent battery inverter units are in each case connected to one another via a compensation fuse. One less compensation fuse can therefore be used than the battery inverter system has battery inverter units. Nevertheless, in the event of a short circuit, a plurality of compensation fuses can be triggered and may then subsequently be replaced.

In another embodiment of the disclosure, each of the battery inverter units is connected to a common neutral point of the battery inverter system via a compensation fuse. Here, the number of compensation fuses corresponds to the number of battery inverter units. In the event of a short circuit, only the compensation fuse which connects the short-circuiting inverter to the neutral point is triggered in this embodiment, since the short circuit current of all other battery units flows across this compensation fuse, while only the short circuit current of an individual battery unit flows across all other compensation fuses in each case.

In one embodiment, one may configure the battery inverter units of the battery inverter system according to the disclosure to be identical in power, since this makes it possible to achieve low compensation currents between the inverters. In this case, the embodiment of inverters being identical in construction is advantageous, so that compensation currents can at least theoretically be completely prevented as a result of driving the inverters with a common drive pulse pattern.

Furthermore, it is advantageous in one embodiment if between the battery inverter units there is an equal ratio between a storage capacity of the respective battery unit and a power of the associated inverter. This also minimizes compensation currents across the compensation fuses during operation.

In one embodiment, the battery inverter system is, or the inverters are, designed without a neutral conductor connection. As a result, corresponding neutral conductor currents which would have to be compensated via the compensation lines cannot arise in the first place.

In one embodiment, the inverters do not employ DC/DC converters. This ensures that identical DC voltages are applied to the inputs of the inverter bridges, which also contributes to avoiding compensation currents between the inverters.

It is conceivable to minimize circulating currents with the aid of suitable, circulating current suppressing AC choke arrangements, but chokes of this type represent a significant additional effort for the battery inverter system. In such an embodiment, the term circulating current suppressing sinusoidal filter is understood to mean a choke arrangement in which the inductance for the zero-sequence system reaches or exceeds the inductance for the positive-sequence system.

The measures described herein, aimed at minimizing compensation currents, enable the battery inverter system to be configured in such a way that circulating current suppressing AC choke arrangements can be obviated, for example, by filter chokes of the sinusoidal filters of the battery inverter units not being magnetically coupled to one another. Optionally, in one embodiment filter capacitors of the sinusoidal filters are in each case connected to a common reference potential. This is the case, for example, with a separate three-leg choke as a sinusoidal filter for each of the inverters. In this way, a particularly cost-effective battery inverter system is achieved.

In addition, in one embodiment it is conceivable for the inverters of the battery inverter system to be connected in parallel on the AC side downstream of the sinusoidal filter, wherein a common filter choke or a common grid filter with further components, in particular common filter capacitors, is connected downstream of the battery inverter units connected in parallel on the AC side.

The inverters of the battery inverter units can be accommodated in separate housings in one embodiment, but it is also conceivable in other embodiments for a plurality of battery inverter units, at least their inverters and sinusoidal filters, to be accommodated in a common housing.

BRIEF DESCRIPTION OF THE DRAWINGS

The disclosure is represented hereinafter by means of figures, of which.

DETAILED DESCRIPTION

Figure 1:
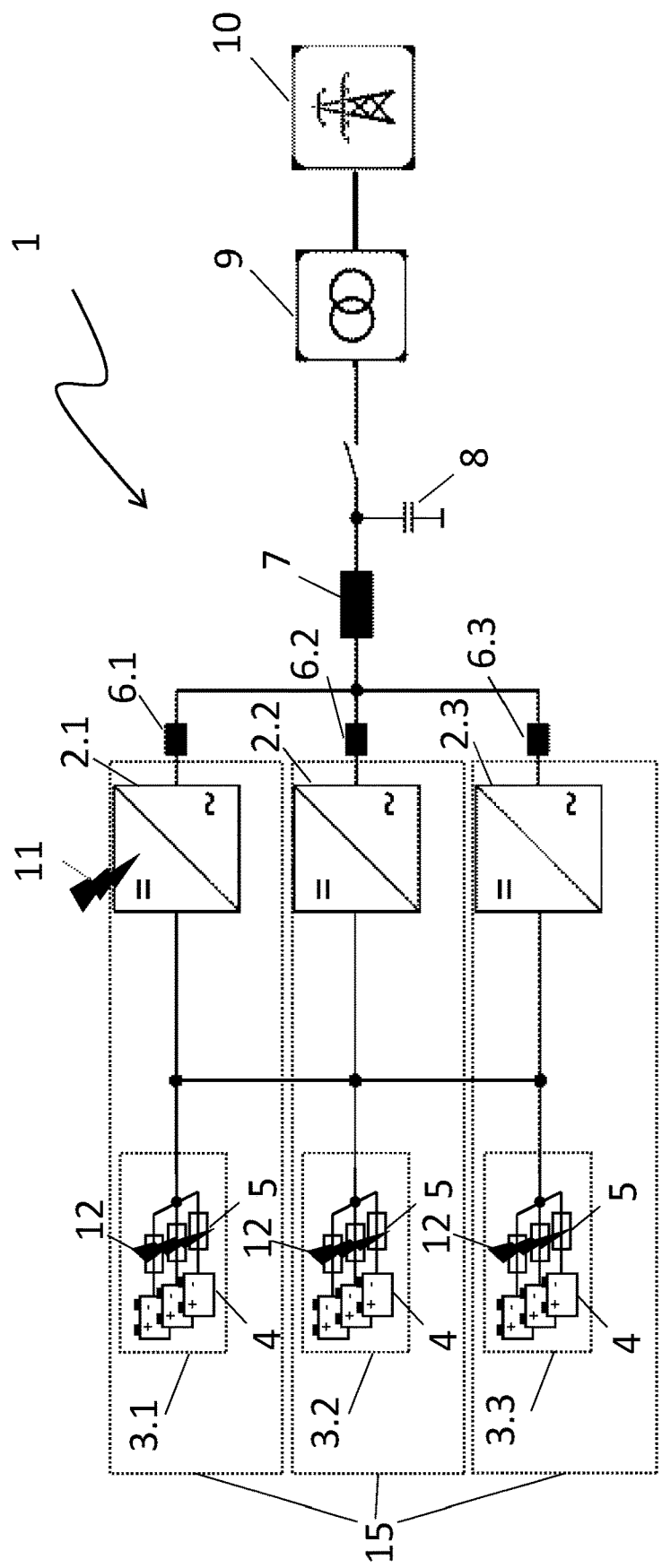
FIG. 1 shows a battery inverter system with battery units connected in parallel.

FIG. 1 shows a battery inverter system 1 with three inverters 2.1 to 2.3 connected to a common AC connection point on the AC side via sinusoidal filters 6.1 to 6.3 associated with the inverters 2.1 to 2.3. The sinusoidal filters 6.1 to 6.3 are only shown as filter chokes here but can also include further components, in particular, filter capacitors.

Starting from the common connection point, the battery inverter system 1 is connected to a grid 10 via a common filter choke 7 and a common filter capacitor 8, a disconnector and a transformer 9. In some embodiment, for example, in all of the embodiments described, this also comprises the case in which, with multiphase inverters, for example, three-phase inverters, the common filter choke 7 for each phase comprises a separate filter choke or a filter choke arrangement with filter windings for each of the phases, that may also be magnetically coupled. A separate filter capacitor may also be provided for each of the phases.

The inverters 2.1 to 2.3 are connected to battery units 3.1 to 3.3 on the DC side, so that in each case a battery unit is associated with one of the inverters and together form a battery inverter unit 15. The battery inverter units 15 for their part are connected in parallel via connecting lines, for example a DC bus. The battery units 3.1 to 3.3 are formed from a plurality of individual units 4 as energy storage devices. The individual units 4 can, for example, be accommodated as battery packs in shelf units, the so-called racks, for example, in a removable manner. Each individual unit 4 is protected against overcurrent in the event of a short circuit via a rack fuse 5, for example. The rack fuses 5 have a nominal value as a current limit that, if permanently exceeded, triggers the rack fuse 5 and the associated battery unit 4 is disconnected from the inverters 2.1 to 2.3. After triggering, the rack fuse is defective as a one-way fuse and must be replaced.

In the case of a fault event, symbolized here as a short circuit 11 by way of example at the inverter 2.1, all battery units provide their short circuit current that exceeds the nominal value of the respective rack fuses 5, so that a trigger event 12 occurs at all the rack fuses 5. As a result of the short circuit 11, all the rack fuses 5 must consequently be replaced in a conventional arrangement, which is associated with high costs and effort.

Figure 2:
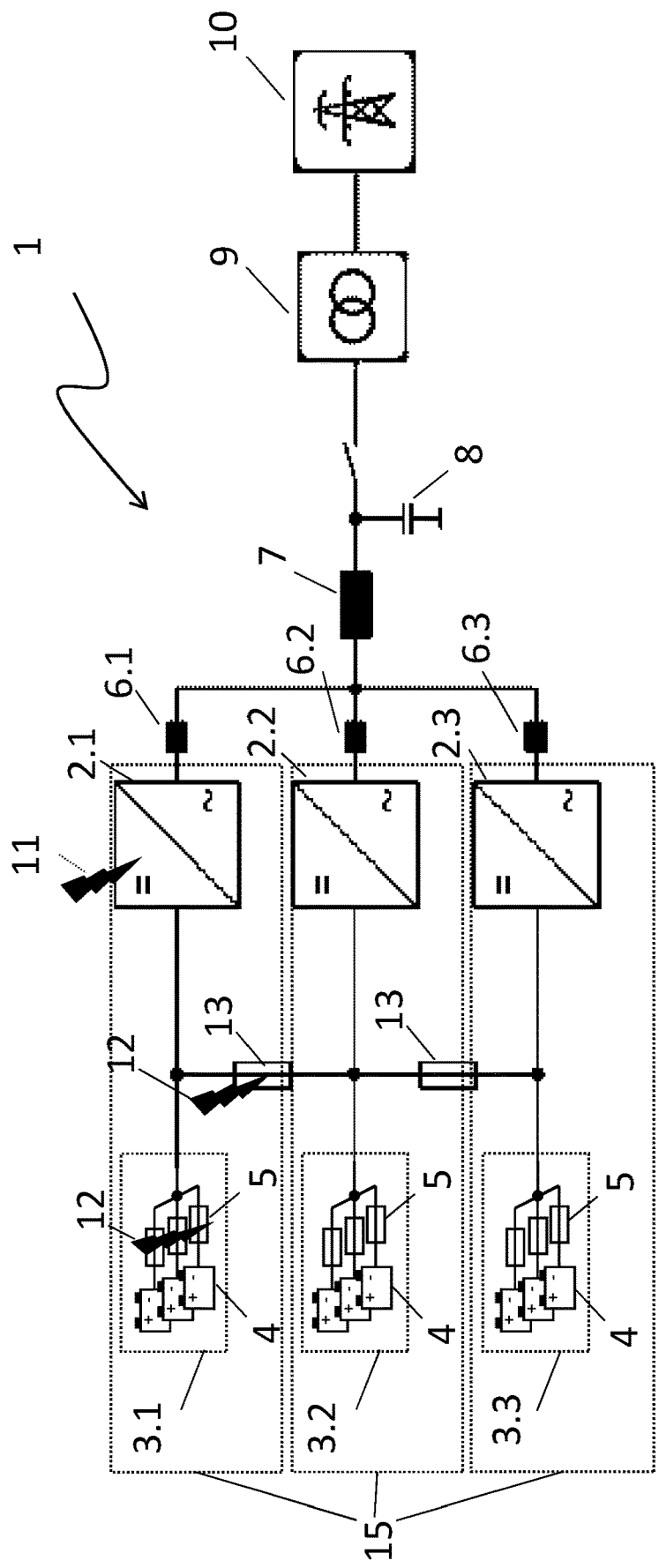
FIG. 2 shows an embodiment of a battery inverter system according to the disclosure.

FIG. 2 shows an embodiment of a battery inverter system 1 according to the disclosure. Here too, a battery unit 3.1 to 3.3 is associated with each inverter 2.1 to 2.3, respectively, in order to form a battery inverter unit 15. In contrast to the battery inverter system according to FIG. 1, the connecting lines between the battery inverter units 15 are formed via compensation fuses 13, wherein a compensation fuse 13 is arranged between adjacent battery inverter units 15 in each case. There is therefore, in one embodiment, one less compensation fuse 13 in the battery inverter system than there are battery units 3.1 to 3.3 or inverters 2.1 to 2.3. In addition to the three battery inverter units 15 shown, further battery inverter units can also be added and connected in parallel on the AC side and connected to the other battery inverter units 15 on the DC side via compensation fuses 13, in order to increase the total power of the battery inverter system 1.

In the event of a short circuit 11, here shown again for inverter 2.1, a trigger event 12 still occurs for all rack fuses 5 of the affected battery inverter unit 15. The rack fuses 5 of the other battery inverter units, here the rack fuses 5 of the battery units 3.2 and 3.3, are protected from triggering, since the compensation fuses 13 connected directly to the short-circuiting inverter, owing to the higher short circuit current flowing there, are triggered prior to the protected rack fuses 5 and resolve the short circuit of the corresponding battery units, here battery units 3.2 and 3.3. In this case, it helps that not only the short circuit current of an individual unit 4 but rather the cumulative short circuit current of the battery units 3.2 and 3.3 flows across the compensation fuse 13 and ensures a fast triggering of the corresponding compensation fuse 13. It is therefore not necessary to replace the rack fuses 5 of the battery units 3.2 and 3.3, only the triggered compensation fuse 13 or the triggered compensation fuses 13, respectively, and also all of the rack fuses 5 of the affected battery unit 3.1 have to be replaced.

In order to prevent an undesired triggering of a compensation fuse 13 already within the scope of a normal operation of the battery inverter system 1, i.e. without a short circuit, it is necessary for the battery inverter system 1 to be operated in such a way that compensation or circulating currents between the inverters 2.1 to 2.3 are minimized by the driving of the inverter bridges comprised in the inverters. This can be achieved in one embodiment by driving the inverter bridges with the same drive pulse pattern, and by the inverters being provided as identical in power and, for example, in construction. In principle, compensation currents between the inverters can also be reduced by complex AC filter arrangements, in which, for example, filter windings between phase outputs of different inverters are magnetically coupled, and/or an individual and complex driving of the individual inverters, whereby, however, the cost advantage of the disclosure is then not realized.

Figure 3:
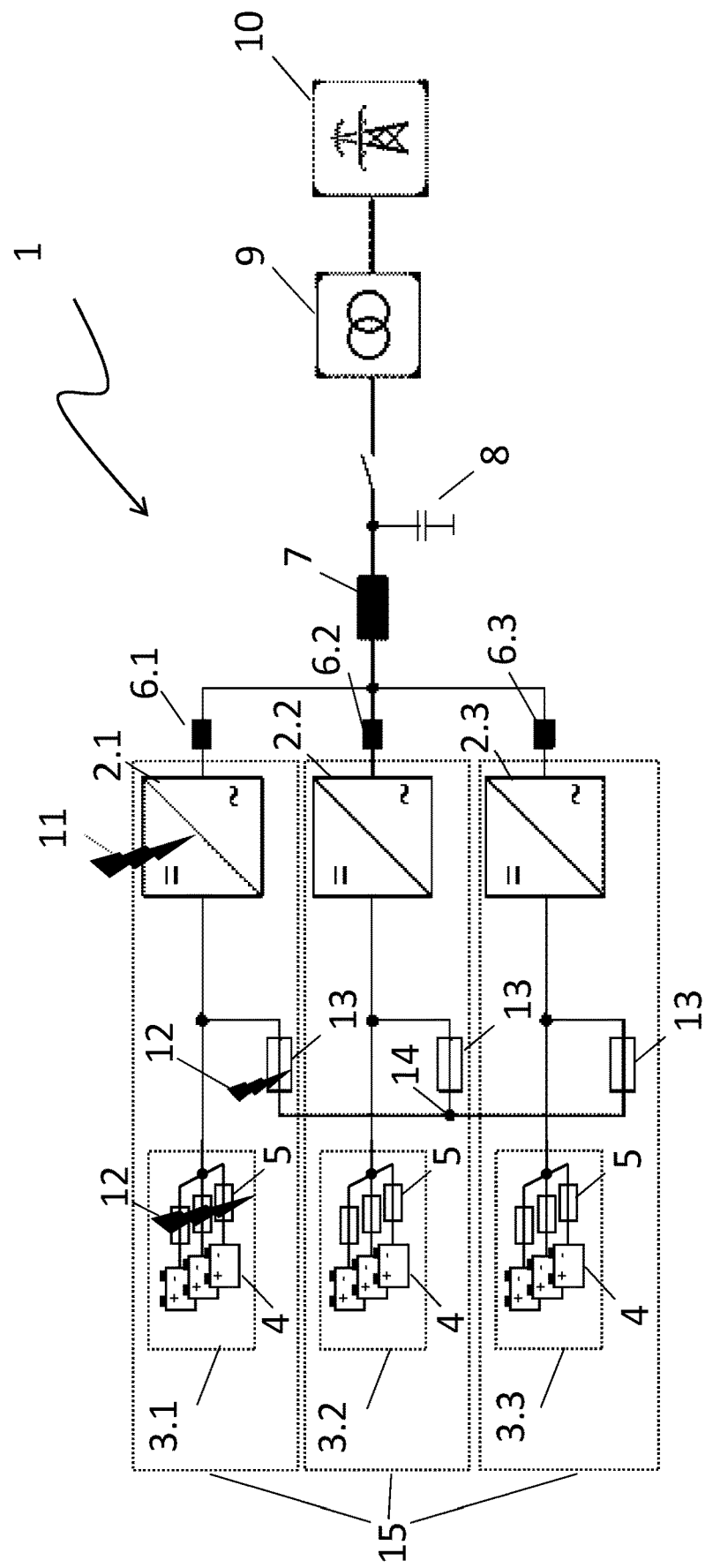
FIG. 3 shows another embodiment of a battery inverter system according to the disclosure.

FIG. 3 shows another embodiment of a battery inverter system 1 according to the disclosure. In contrast to the embodiment according to FIG. 2, in this embodiment each of the connecting lines between the battery inverter units 15 is connected to a common neutral point 14 via a respective compensation fuse 13. Here, the number of compensation fuses 13 therefore corresponds to the number of battery inverter units 15. In the event of a short circuit 11, here, in turn, shown at the inverter 2.1, a trigger event 12 occurs at all rack fuses 5 of the battery unit 3.1 associated with the short-circuiting inverter 2.1, as is also the case in the embodiment according to FIG. 2. In addition, a trigger event 12 also occurs at the compensation fuse 13 which connects the short-circuiting inverter 2.1 to the neutral point 14. In this embodiment, only one of the compensation fuses 13 is therefore triggered in each case, that is also supported by the fact that the short circuit current of all remaining battery units, here battery units 3.2 to 3.3, flows across the triggering output fuse 13. As a result of the trigger event 12 of the affected compensation fuse 13, all remaining rack fuses 5 are protected from triggering and do not have to be replaced.

The invention claimed is:

1. A battery inverter system, comprising:
a plurality of battery inverter units, wherein each battery inverter unit comprises:
an inverter, and
a battery unit connected to the inverter on a DC side thereof,
wherein the battery unit comprises a plurality of individual energy storage devices connected in parallel to one another that are each protected against an overcurrent condition by means of a respective rack fuse, and
wherein the battery inverter units are connected in parallel with one another on an AC side of the inverters and are configured to operate together with a common drive pulse pattern,
wherein each of the plurality of battery inverter units are interconnected with one another on the DC side of their respective inverters via compensation fuses connected between the respective inverter and rack fuses of the corresponding battery inverter unit, and wherein a nominal trigger value of each compensation fuse is less than a nominal trigger value of the rack fuses in each battery inverter unit such that the compensation fuses are configured to trigger faster than the rack fuses in the event of a short circuit in one of the inverters.

2. The battery inverter system as claimed in claim 1, wherein adjacent battery inverter units are connected to one another on the DC side thereof via a respective one of the compensation fuses.

3. The battery inverter system as claimed in claim 1, wherein each of the battery inverter units is connected to a common neutral point via one of the respective compensation fuses.

4. The battery inverter system as claimed in claim 1, wherein the inverters comprise three-phase inverters.

5. The battery inverter system as claimed in claim 1, wherein the battery inverter units are identical in construction and/or power.

6. The battery inverter system as claimed in claim 1, wherein among the battery inverter units, a ratio between a storage capacity of the respective battery unit and a power of the associated inverter for each of the plurality of battery inverter units are equal to each other.

7. The battery inverter system as claimed in claim 1, wherein the inverters are provided without a neutral conductor connection.

8. The battery inverter system as claimed in claim 1, wherein the inverters do not employ DC/DC converters.

9. The battery inverter system as claimed in claim 1, wherein a nominal current of the rack fuses and a nominal current of the compensation fuses differ by no more than a factor of two.

10. The battery inverter system as claimed in claim 1, wherein a nominal current of the rack fuses and a nominal current of the compensation fuses are the same.

11. The battery inverter system as claimed in claim 1, wherein a nominal current of the rack fuses and a nominal current of the compensation fuses are within a range between 100 A and 1000 A.

12. The battery inverter system as claimed in claim 1, wherein the inverters of the battery inverter units each comprise a sinusoidal filter comprising a filter choke and a filter capacitor, and wherein the filter choke of each of the sinusoidal filters of the battery inverter units are not magnetically coupled to one another.

13. The battery inverter system as claimed in claim 12, wherein the filter capacitors of the sinusoidal filters are each connected to a common reference potential.

14. The battery inverter system as claimed in claim 1, wherein each of the inverters are connected in parallel to one another on the AC sides thereof via a sinusoidal filter.

15. The battery inverter system as claimed in claim 1, wherein a common filter choke is connected downstream of the battery inverter units connected in parallel on the AC side of the inverters.

\* \* \* \* \*